Patented Jan. 31, 1928.

1,657,522

UNITED STATES PATENT OFFICE.

MORRIS L. WEISS, OF NEWARK, NEW JERSEY, ASSIGNOR TO DOVAN CHEMICAL CORPORATION, OF NEW YORK, N. Y., A CORPORATION OF NEW YORK.

PROCESS FOR VULCANIZING RUBBER AND PRODUCTS OBTAINED THEREBY.

No Drawing. Application filed August 7, 1925, Serial No. 48,889. Renewed July 1, 1927.

This invention relates to processes for vulcanizing rubber and similar materials and to the products obtained thereby, and is more particularly directed to acceleration of vulcanization by a class of products formed by reaction with substituted guanidines.

One of the objects of the invention is to provide a material which will efficiently accelerate vulcanization of rubber, particularly at relatively high temperatures; to provide a simple process for the use of the material and to produce a series of useful vulcanized rubber products.

In accordance with my invention I have found that the diphenyl guanidine reaction product with 2-6 dimercapto 3-5 diphenyl 4-oxy pentathiophene and similar substances are valuable accelerators of vulcanization.

My invention accordingly comprises a process for treating rubber which includes combining rubber with a reaction product of a substance having the general formula

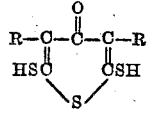

with a basic substituted guanidine having an imid group as a vulcanizing ingredient and vulcanizing the rubber. R in the above formula may be either alkyl or aryl. In using the expression "as a vulcanizing ingredient" I mean that the reaction product is a component part of the combination or mixture which is used to effect vulcanization and which ordinarily includes sulfur and may, and preferably does include zinc oxide or equivalent thereof.

In carrying out the process in its preferred form I mix preferably on the mixing mill in the usual manner, 100 pounds of pale crepe rubber, 3 pounds of sulfur, 5 pounds of zinc oxide, 1 pound of 2-6 dimercapto 3-5 diphenyl 4-oxy pentathiophene. After milling is complete the mixture is placed in a mould and heated at 40 pounds per square inch steam pressure for 45 minutes, at the end of which time satisfactory vulcanization has occurred.

I have found that the rubber vulcanized in this manner has a tensile strength of 3342 pounds per square inch and an elongation of 790 per cent.

When compared with diphenyl guanidine, which is one of the reacting substances from which the preferred accelerator is made, it is found that it possesses somewhat similar accelerating properties to this substance but operates at a somewhat higher temperature than diphenyl guanidine. This property insures practically complete freedom from prevulcanization or "burning" in milling. When the preferred accelerator is compared with 2-6 dimercapto 3-5 diphenyl 4-oxy pentathiophene, it is found that it is much stronger than this latter substance which, it will be recognized, is one of the parent substances from which the preferred accelerator is made. I have given below a tabulation showing the results of vulcanization employing respectively and successively, diphenyl guanidine, 2-6 dimercapto 3-5 diphenyl 4-oxy pentathiophene, and the reaction product of diphenyl guanidine and 2-6 dimercapto 3-5 diphenyl 4-oxy pentathiophene at varying temperatures and times.

| Accelerator used | 30 min.@20 lbs./in.² | | 45 min.@20 lbs./in.² | |
|---|---|---|---|---|
| | Per cent elong. | Lbs./in.² tensile | Per cent elong. | Lbs./in.² tensile |
| Reaction product of diphenyl guanidine and 2-6 dimercapto 3-5 diphenyl 4-oxy pentathiophene | No cure | | 870 | 175 |
| 2-6 dimercapto 3-5 diphenyl 4-oxy pentathiophene | " " | | No cure | |
| Diphenyl guanidine | 950 | 460 | 935 | 1040 |

| | 20 min.@40 lbs./in.² | | 30 min.@40 lbs./in.² | | 45 min.@40 lbs./in.² | | 60 min.@40 lbs./in.² | |
|---|---|---|---|---|---|---|---|---|
| | Per cent elong. | Lbs./in.² tensile | Per cent elong. | Lbs./in.² tensile | Per cent elong. | Lbs./in.² tensile | Per cent elong. | Lbs./in.² tensile |
| Reaction product of diphenyl guanidine and 2-6 dimercapto 3-5 diphenyl 4-oxy pentathiophene | 910 | 2,487 | 840 | 2,848 | 790 | 3,342 | 730 | 3,727 |
| Diphenyl guanidine | 885 | 2,637 | 880 | 2,945 | 760 | 3,552 | 760 | 3,910 |
| 2-6 dimercapto 3-5 diphenyl 4-oxy pentathiophene | 1,030 | 1,120 | 950 | 1,210 | 980 | 1,872 | 960 | 2,102 |

The compounds used in carrying out the above test were as follows:

| | Pounds. |
|---|---|
| Pale crepe rubber | 100 |
| Sulfur | 3 |
| Zinc oxide | 5 |
| Accelerator | 1 |

It has been found that higher tensile strength may be obtained by the use of the accelerator given in the preferred example, by employing more sulfur with this accelerator, keeping the quantities of the other ingredients, including that of the accelerator, the same as given in the preferred example above. For example, at 40 pounds steam pressure for 45 minutes employing six parts of sulfur with the ingredients remaining the same I have obtained a tensile strength of 3710 pounds per square inch as compared with 3342 pounds per square inch where a less amount of sulfur is employed.

It will be understood that the reaction product given in the preferred example may be replaced in whole or in part by other similar substances, for example, in the reaction product of diphenyl guanidine and 2-6 dimercapto 3-5 diphenyl 4-oxy pentathiophene, the phenyl groups of the latter substance may be replaced by alkyl or aryl groups to provide similar results upon vulcanization. The alpha and beta positions of the guanidine may also be substituted as desired. It will be observed that the preferred example given above employs zinc oxide. I have found that zinc oxide may be omitted if desired, and some acceleration of vulcanization will occur under such conditions. It is preferably, however, that zinc oxide or its equivalent be present.

In preparing the reaction product mentioned in the preferred example, the sodium salt of 2-6 dimercapto 3-5 diphenyl 4-oxy pentathiophene is prepared in accordance with a procedure which may be found in literature. This sodium salt is dissolved in water and is treated with a water solution of diphenyl guanidine hydrochloride. The reaction which occurs is as follows:—

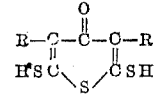

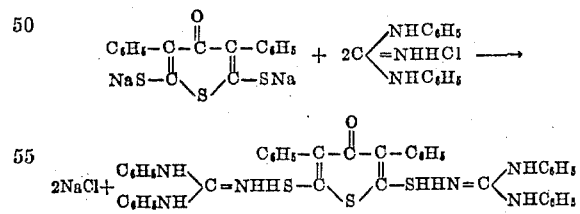

The resulting reaction product which is only slightly soluble in water is precipitated and filtered off. It may be recrystallized from ethyl alcohol in which it is soluble. The resulting purified product is a lemon yellow crystalline substance which has a melting point of approximately 189° C. Upon heating the substance above this melting point decomposition does not occur until approximately 205° C. has been reached. The compound is thus clearly distinguished from the parent substance 2-6 dimercapto 3-5 diphenyl 4-oxy pentathiophene which has a melting point of approximately 165° C. and which decomposes at that temperature. The reaction product is further distinguished by the fact that it possesses substantially no mercaptan odor, whereas 2-6 dimercapto 3-5 diphenyl 4-oxy pentathiophene has a disagreeable characteristic mercaptan smell.

As many apparently widely different embodiments of this invention may be made without departing from the scope thereof, it is to be understood that I do not intend to limit myself to the specific embodiment of the invention herein described, except as indicated in the appended claims.

What I claim is:

1. A process for treating rubber, which comprises combining rubber with a reaction product of a substance having the general formula

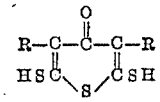

and a basic substituted guanidine having an imid group as a vulcanizing ingredient, and vulcanizing the rubber.

2. A process for treating rubber, which comprises combining rubber with a reaction product of 2-6 dimercapto 3-5 diphenyl 4-oxy pentathiophene and a disubstituted guanidine having an imid group as a vulcanizing ingredient, and vulcanizing the rubber.

3. A process for treating rubber, which comprises combining rubber with the reaction product of 2-6 dimercapto 3-5 diphenyl 4-oxy pentathiophene and diphenyl guanidine having an imid group as a vulcanizing ingredient, and vulcanizing the rubber.

4. A process for treating rubber, which comprises combining rubber, a zinc compound, sulfur and the reaction product of 2-6 dimercapto 3-5 diphenyl 4-oxy pentathiophene and diphenyl guanidine having an imid group and vulcanizing the rubber.

5. As a new product, a vulcanized rubber derived from rubber combined with a reaction product of a substance having the general formula $$R-\underset{HS}{\overset{O}{\underset{\|}{C}}}-\underset{\|}{\overset{}{C}}-\underset{S}{\overset{}{C}}-R$$
$$HSC\diagdown_S\diagup CSH$$

and a basic substituted guanidine having an imid group as a vulcanizing ingredient.

6. As a new product, a vulcanized rubber derived from rubber combined with a reaction product of 2-6 dimercapto 3-5 diphenyl 4-oxy pentathiophene and a disubstituted guanidine having an imid group.

7. As a new product, a vulcanized rubber derived from rubber combined with the reaction product of 2-6 dimercapto 3-5 diphenyl-4-oxy pentathiophene and diphenyl guanidine having an imid group as a vulcanizing ingredient.

8. As a new product, a vulcanized rubber derived from rubber combined with sulfur, a compound of zinc and the reaction product of 2-6 dimercapto 3-5 diphenyl 4-oxy pentathiophene and diphenyl guanidine, having an imid group, as a vulcanizing ingredient.

Signed at New York, N. Y., this 6th day of August, 1925.

MORRIS L. WEISS.

CERTIFICATE OF CORRECTION.

Patent No. 1,657,522.                    Granted January 31, 1928, to

MORRIS L. WEISS.

It is hereby certified that error appears in the above numbered patent requiring correction as follows: In the heading to the printed specification, line 6, date of Renewal for "July 1, 1927," read "May 19, 1927,"; and that the said Letters Patent should be read with this correction therein that the same may conform to the record of the case in the Patent Office.

Signed and sealed this 21st day of February, A. D. 1928.

Seal.

M. J. Moore,
Acting Commissioner of Patents.